(12) United States Patent
Goasguen

(10) Patent No.: US 10,712,065 B2
(45) Date of Patent: Jul. 14, 2020

(54) HIGH FLOW FILLING EQUIPMENT AND METHOD

(71) Applicant: Fives Filling & Sealing, Le Bignon (FR)

(72) Inventor: Jacques Goasguen, Le Bignon (FR)

(73) Assignee: FIVES FILLING & SEALING, Le Bignon (FR)

( * ) Notice: Subject to any disclaimer, the term of this patent is extended or adjusted under 35 U.S.C. 154(b) by 79 days.

(21) Appl. No.: 15/945,387

(22) Filed: Apr. 4, 2018

(65) Prior Publication Data

US 2018/0292117 A1    Oct. 11, 2018

(30) Foreign Application Priority Data

Apr. 7, 2017 (FR) ...................................... 17 53049

(51) Int. Cl.
*B67D 7/02* (2010.01)
*F16K 31/122* (2006.01)
(Continued)

(52) U.S. Cl.
CPC ............ *F25B 45/00* (2013.01); *B67D 7/0294* (2013.01); *B67D 7/36* (2013.01); *F01P 11/0204* (2013.01);
(Continued)

(58) Field of Classification Search
CPC ..... B67D 7/0294; B67D 7/36; F16K 31/1221; F01P 11/0204; F01P 11/0285; F25B 45/00
See application file for complete search history.

(56) References Cited

U.S. PATENT DOCUMENTS 3,684,006 A * 8/1972 Spahn ..................... F16K 15/18
165/97
6,076,703 A * 6/2000 Kuil ..................... B67D 1/1247
116/110
(Continued)

FOREIGN PATENT DOCUMENTS

DE          94 06 842 U1     7/1994
EP          2 816 265 A1    12/2014
WO       2009/035926 A2     3/2009

OTHER PUBLICATIONS

French Preliminary Search Report, dated Dec. 7, 2017, from corresponding FR application No. FR 17 53049.

*Primary Examiner* — Umashankar Venkatesan
(74) *Attorney, Agent, or Firm* — Young & Thompson

(57) ABSTRACT

Equipment for transferring fluid into a reservoir or a downstream pipe includes: a piston valve having a body and a rod with a closing member; a chassis defining a housing receiving the piston valve and an upstream passage for fluid, the piston valve movable between a non-inserted and inserted positions, with the piston outside and inside the housing, respectively; and a module defining a cavity for receiving the fluid from the upstream passage and a downstream discharge passage intended to be fluidly connected to the reservoir or downstream pipe, the inlet of the discharge passage defining a valve seat intended to receive the closing member of the piston valve in the deployed position, the module being movable relative to the chassis between an open position, allowing the piston valve to be inserted in the housing, and a closed position, in which the module is fastened to the chassis.

9 Claims, 3 Drawing Sheets

(51) Int. Cl.
*B67D 7/36* (2010.01)
*F25B 45/00* (2006.01)
*F01P 11/02* (2006.01)

(52) U.S. Cl.
CPC ...... *F01P 11/0285* (2013.01); *F16K 31/1221* (2013.01)

(56) References Cited

U.S. PATENT DOCUMENTS

| | | |
|---|---|---|
| 6,257,285 B1 | 7/2001 | Robinson et al. |
| 6,988,710 B2 * | 1/2006 | Igarashi .................... F16K 7/17 137/468 |
| 8,256,738 B2 | 9/2012 | Johnson et al. |
| 8,678,348 B1 * | 3/2014 | Cassel ....................... F16K 1/04 251/223 |
| 8,820,703 B2 | 9/2014 | Johnson et al. |
| 9,395,016 B2 | 7/2016 | Johnson et al. |
| 9,587,757 B2 | 3/2017 | Johnson et al. |
| 9,841,116 B2 | 12/2017 | Johnson et al. |
| 10,371,309 B2 * | 8/2019 | Gazave ................... F16K 27/02 |
| 2005/0151100 A1 * | 7/2005 | Dalmasso ............. B65D 88/703 251/28 |
| 2014/0070126 A1 * | 3/2014 | Robinson ............ F16K 31/1221 251/333 |
| 2014/0367601 A1 | 12/2014 | Rada |

* cited by examiner

HIGH FLOW FILLING EQUIPMENT AND METHOD

BACKGROUND OF THE INVENTION

Field of the Invention

The present invention relates to equipment and a method intended to transfer a fluid from a filling unit to a reservoir or a downstream pipe. It is in particular applicable for transferring fluids such as brake, air-conditioning or cooling fluid, to the corresponding fluid circuit of a motor vehicle, for example on an automobile assembly line, or in the energy sector for filling electric radiators with fluid.

In addition to being able to manage the efficient openings and closings of fluid connections guaranteeing operator safety, the work ergonomics and the proper metering of fluid transferred into the reservoirs or downstream pipe, the filling equipment must be suitable for the unit volumes to be transferred. From an economic perspective, the larger the volume to be moved is, the more optimized the sizing of the equipment must be to limit the loading time. Furthermore, maintenance must be facilitated to limit lost time on the production chain. To that end, the filling equipment is provided with valves making it possible to block or open the fluid connections at the operators request. These valves are controlled by hydraulic systems or pneumatic systems, or by electrical systems.

Description of Related Art

Document U.S. Pat. No. 6,257,285 is known, which presents a tool for discharging and filling fluid in a fluid system. This solution makes it possible to limit the bulk and weight of the tool, but does not examine maintenance and accessibility issues with components such as the valves. It is necessary to disassemble the chassis to access them, and they are assembled directly in the chassis, which can cause small parts to be lost during the disassembly of said valves. These assembly and disassembly operations are fairly frequent and are time-consuming for operators.

The present invention therefore seeks to offset the aforementioned drawback, by proposing to simplify the removal of the valves from the chassis to guarantee replacement by the operator, while maintaining the functionalities and filling performance levels.

BRIEF SUMMARY OF THE INVENTION

To that end, the invention relates to equipment for transferring fluid into a reservoir or a downstream pipe, the equipment comprising:
- a piston valve having a body and a rod comprising at its end a closing member,
- a chassis defining a housing for receiving the piston valve and an upstream passage for the fluid intended to be fluidly connected to a fluid source, the piston valve is mobile in translation in an insertion direction D1, between a non-inserted position in which the piston valve is located outside the housing, and an inserted position in which the piston valve is located in the housing,
- a module defining a cavity for receiving the fluid from the upstream passage and a downstream discharge passage intended to be fluidly connected to the reservoir or downstream pipe, the inlet of the discharge passage defining a valve seat intended to receive the closing member of the piston valve in the deployed position, the module is movable relative to the chassis between an open position, allowing the piston valve to be inserted in the housing, and a closed position, in which the module is fastened to the chassis.

According to certain specific embodiments, the equipment further comprises one or more of the following features, considered alone or according to all technically possible combinations:
- the piston valve comprises a pneumatic or hydraulic control system of the closing member, the control system comprises a supply orifice defined by the body, and two sealing gaskets ensuring sealing of the supply orifice with the chassis.
- two sealing gaskets form drawstrings closed around the axial direction D1 and are respectively compressed substantially in the insertion direction D1 between the piston valve and the chassis, and between the piston valve and the module when the piston valve is in the inserted position and the module is in the closed position.
- the chassis defines at least one upstream channel intended to be connected to a fluid suction and/or vacuum line, said at least one upstream channel communicates with a downstream channel of the module, the downstream channel (34) being connected to the downstream passage below the valve seat.
- the at least one upstream channel emerges in a housing able to receive a coaxial valve, said coaxial valve being cylindrical and comprising sealing gaskets on its two end surfaces A, B, opposed in the insertion direction D2 and compressed substantially in the insertion direction D2 between the coaxial valve and the chassis and between the coaxial valve and the module when the coaxial valve is in the inserted position and the module is in the closed position.
- the lower ends of the valves are situated in the same plane P when they are in the inserted position, and in that the module in the closed position presses on this plane P so as to keep said valves in their respective housings.
- the valves do not comprise a fastening system in the chassis and in that in the open position, the module allows the valves to be released from their housings.

The invention also relates to a method for transferring a fluid into a reservoir or into a downstream pipe, comprising the following steps:
- providing a piston valve having a body and a rod comprising at its end a closing member,
- providing a chassis defining a housing for receiving the piston valve and an upstream passage for the fluid intended to be fluidly connected to a fluid source, the piston valve is mobile in translation in an insertion direction D1, between a non-inserted position in which the piston valve is located outside the housing, and an inserted position in which the valve is located in the housing,
- fluidly connecting the upstream passage to a fluid source,
- providing a module defining a cavity for receiving the fluid from the upstream passage and a downstream discharge passage intended to be fluidly connected to the reservoir or downstream pipe, the inlet of the downstream discharge passage defining a valve seat intended to receive the closing member of the piston valve in the deployed position, the module being movable relative to the chassis between an open position, allowing the piston valve to be inserted in the housing, and a closed position, in which the module is fastened to the chassis.

fluidly connecting the downstream passage to the reservoir or downstream pipe.

According to certain specific embodiments, the method further comprises one or more of the following steps, considered alone or according to all technically possible combinations:

providing a pneumatic or hydraulic control system for the closing member, controlling the piston valve with the control system to cause the closing member of the piston valve to go from the deployed position to the withdrawn position, allowing the fluid to pass from the upstream channel to the downstream discharge channel.

BRIEF DESCRIPTION OF THE SEVERAL VIEWS OF THE DRAWINGS

These features and advantages of the invention will appear upon reading the following description, provided solely as a non-limiting example, in reference to the appended drawings, in which.

DETAILED DESCRIPTION OF THE INVENTION

Figure 1:
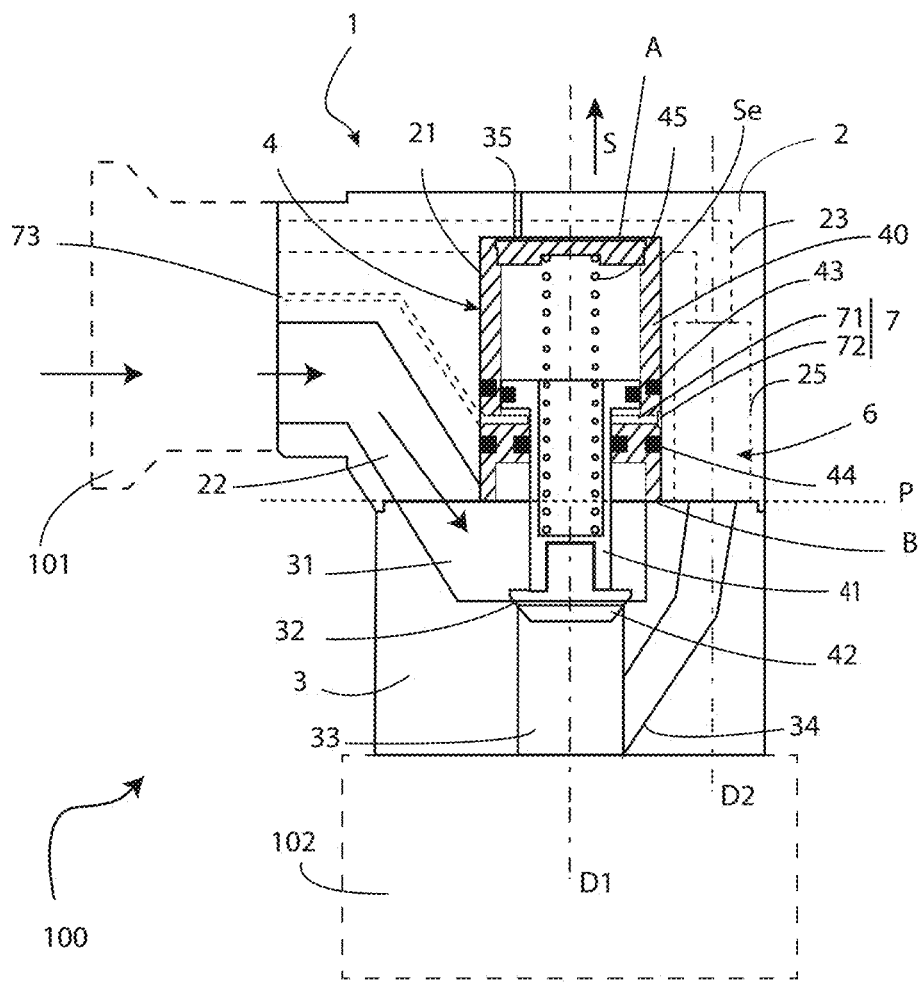
FIG. 1 is a sectional view of an assembly according to the invention in the closed position.
Figure 2:
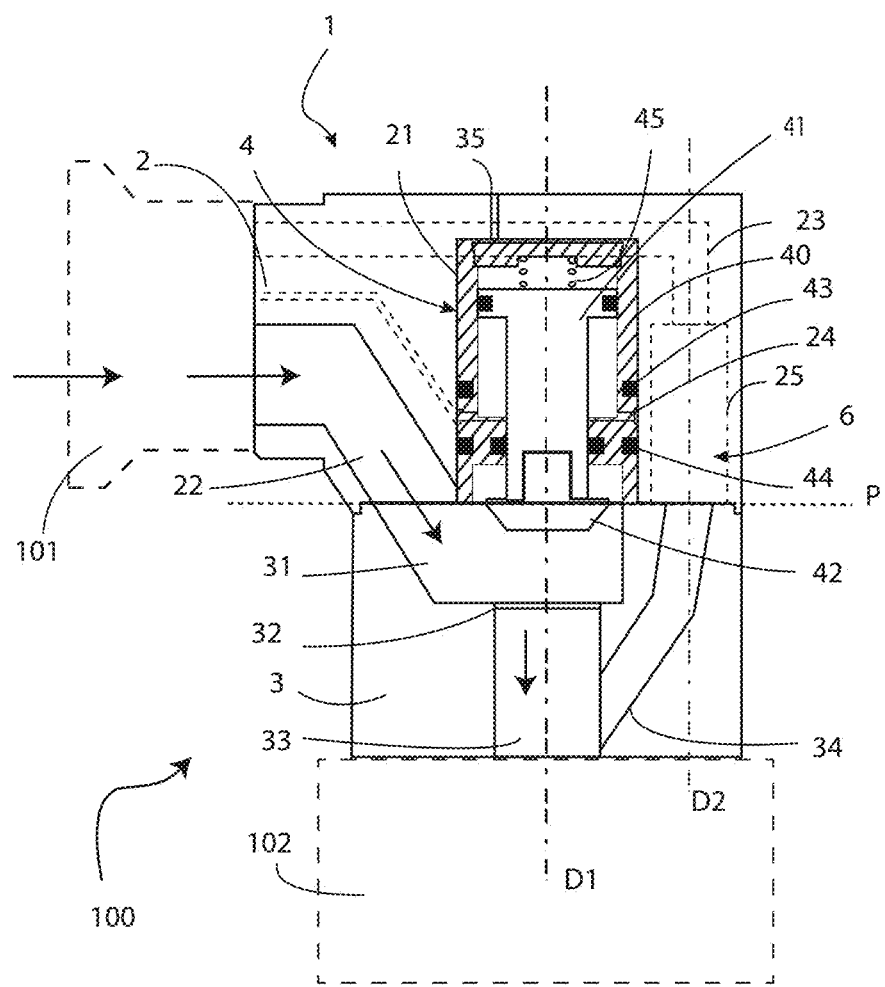
FIG. 2 is a sectional view of this same assembly according to the invention in the open position.
Figure 3:
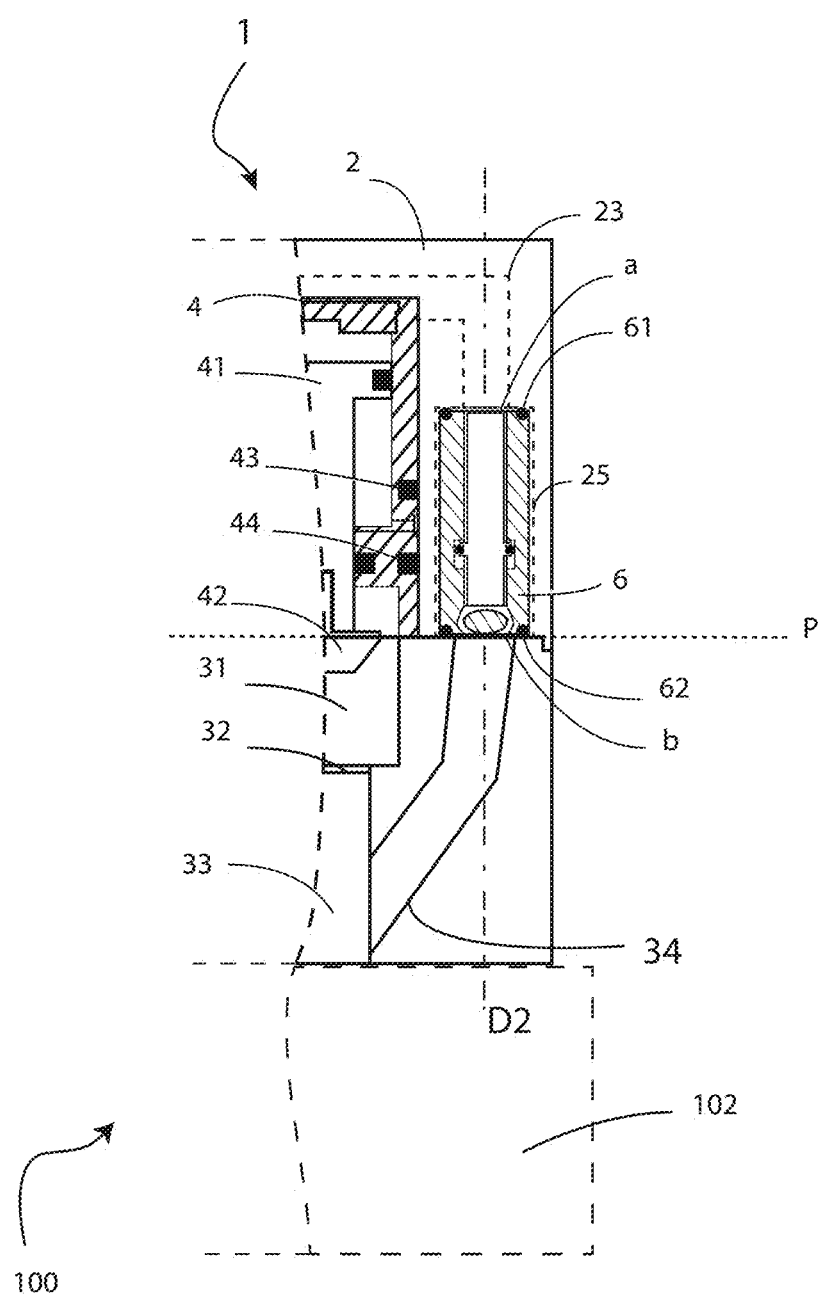
FIG. 3 is a partial axial sectional view of the assembly according to the invention.

An assembly 100 according to the invention is described in reference to FIGS. 1, 2 and 3. The assembly 100 for example concerns the automobile sector and advantageously belongs to an assembly line (not shown) for motor vehicles (not shown). The invention nevertheless applies to all sectors involving filling with fluids, in particular the energy sector for filling electric radiators with fluids.

The assembly 100 comprises a reservoir or downstream pipe 102, a fluid source 101, and a piece of equipment 1, subject matter of the invention, for transferring fluid into the reservoir 102 from the fluid source 101. In the alternative where the element 102 is a downstream pipe, the latter transfers the fluid for example to a reservoir to be filled.

The fluid is for example coolant, air-conditioning fluid or brake fluid.

The fluid source 101 is a fluid dispensing unit, known in itself. The piece of equipment 1 is intended to allow at least partial filling of the reservoir 102 or the transfer of at least part of the fluid to a downstream pipe.

The equipment 1 comprises a chassis 2 defining an upstream passage 22 fluidly connected to the fluid source 101, on the one hand, and a housing 21 intended to receive a piston valve 4 in an insertion direction D1, on the other hand. The piston valve 4 comprises a closing member 42 at the piston rod end 41, a body 40 and sealing gaskets 43 and 44 making it possible to ensure sealing in contact with the chassis 2 between these two gaskets.

The equipment 1 also comprises a module 3 defining a downstream passage 33 preceded by a cavity 31. The downstream passage 33 can be connected to a plunger tube entering the reservoir 102. Said cavity 31 receiving the fluid from the upstream passage 22 before it flows in the downstream passage 33. The inlet of the downstream passage 33 defines a valve seat 32 for receiving the closing member 42 of the piston valve 4.

The piston valve 4 has a pneumatic or hydraulic control system 7 for the closing member 42. A chamber 71, defined between the piston rod 41 and the body 40, is supplied pneumatically or hydraulically by a supply orifice 72 defined by the body 40. This control system 7 is supplied by a supply pipe 73 in the chassis 2. Using this control system 7, the piston rod 41, axially movable relative to the body 40, rises to the withdrawn position when the chamber 71 is filled (FIG. 2). An air discharge pipe 35 makes it possible to release the pressure when raising the piston rod 41. Said rod 41 is lowered again to the deployed position when the chamber 71 is emptied. A return system, for example a spring 45, causes the piston 41 to be lowered again into its deployed position. In this deployed position, the closing member 42 becomes positioned on the valve seat 32 and thus closes the access to the downstream passage 33.

Advantageously, the upstream passage 22, the cavity 31 and the downstream passage 33 make it possible to allow a high fluid flow to pass through their dimensions. The closing member 42 is therefore proportional to the diameter of the downstream passage 33 and the valve seat 32.

The piston valve is movable relative to the chassis 2, for example in translation, in direction D1 between a non-inserted position and an inserted position in which the piston valve 4 is located in the housing 21. In the non-inserted position (not shown), the piston valve 4 is located outside the housing 21. The non-inserted position is deduced from the inserted position shown in FIGS. 1 and 2 by a translation of the valve relative to the chassis 2 in the insertion direction D1. The piston valve 4 is inserted in the direction shown by an arrow S in FIG. 1, and rises from the housing 21 in the direction opposite the arrow S, like a cartridge.

The piston valve 4 comprises two end surfaces A, B, opposed in the insertion direction D1, and an outer side surface Se extending axially between the two end surfaces and substantially parallel to the insertion direction D1. The end surfaces A, B are advantageously planar and perpendicular to the insertion direction D2. The body 40 for example has a cylindrical shape. The body 40 comprises sealing gaskets 43 and 44 that ensure the sealing of the connection between the supply orifice 72 and the supply pipe 73 of the chassis 2. In an alternative embodiment (not shown), a single circular gasket can be used to produce this sealing of the supply orifice in contact with the chassis 2, the circular gasket then being axially centered on the inlet of the orifice 72.

The module 3 is movable relative to the chassis 2 between an open position (not shown), allowing the insertion of the piston valve 4 in the housing 21, and a closed position (FIGS. 1 and 2), in which the module 3 is fastened on the chassis 2. The module 3 for example forms an end piece suitable for being fastened on the reservoir 102 or downstream pipe 102. The module 3 is for example articulated on the chassis 2 by a hinge (not shown).

The open position of the module 3 relative to the chassis 2 allows easier access to the piston valve 4. The operator can then remove the piston valve 4 by catching the rod 41 and its closing member 42. In the closed position of the module 3, the piston valve 4 is pushed into its housing 21 such that its ends A and B are in contact with the chassis 2 and the module 3, respectively. The module 3 in the closed position keeps the piston valve in place in its housing 21.

In one alternative embodiment of the invention, the chassis 2 accommodates an upstream channel 23 intended to be connected to a fluid suction or vacuum line. This channel 23 communicates with a downstream channel 34 located in the module 3. Advantageously, the downstream channel 34 is connected to the passage 33 below the valve seat 32.

To control the suction or the vacuum, an axial valve 6 is used, defining an axial passage and located in a housing 25 on the path of the channel 23 in the chassis 2. This axial valve 6 is controlled by a dedicated pneumatic or hydraulic control system (not shown). The axial valve 6 is of the cartridge type because it is inserted into the housing 25 by translation in direction D2 when the module 3 is in the open position. Laced sealing gaskets 61 and 62 located on the end surfaces a and b, perpendicular to the insertion direction D2, of the axial valve 6 ensure the sealing in contact with the chassis 2 and the module 3 when the latter is in the closed position and substantially compresses the gaskets 61 and 62.

Advantageously, the equipment 1 may comprise several valves 6, and therefore several channels 23, for example to separate the vacuum function and the re-aspiration function of the fluid into the reservoir 102.

From a practical perspective, the lower ends B and b of the valves present in the chassis 2 are located in the same plane P when they are in the inserted position. When the module 3 is in the closed position, it presses on this plane P so as to apply pressure in directions D1 and D2 to compress the sealing gaskets 61 and 62 and/or to keep the valves 4 and 6 in the bottom of their respective housings.

According to a non shown alternative of the invention, the sealing gaskets 43 and 44 intended for the connection between the supply orifice 72 and the supply pipe 73 are respectively located on the end surfaces A and B of the piston valve 4. Thus, when the piston valve 4 is in its inserted position, the sealing gaskets 43 and 44 are respectively compressed substantially in the insertion direction D1 between the piston valve 4 and the chassis 2, and between the piston valve 4 and the module 3, when the module is in the closed position.

The equipment 1 facilitates the placement and replacement of the valves 4 and 6 by operators. In an initial phase, the operator inserts the valve 4 and, depending on the configuration of the equipment 1, the valve(s) 6, until the abutment with the bottom of their housings 21 and 25. The gaskets 43, 44, come into contact with the chassis 2 at the inner wall of the housing 4. The gasket 61 comes into contact with the bottom of the housing 25 at the connection with the upstream channel 23. The operator fastens the module 3 on the chassis 2, thus closing the valve(s) 4, 6 inside the equipment 1. The gasket 62 comes into contact with the module 3 at the connection with the upstream channel 34. By fastening the module 3 on the chassis 2, a mechanical pressure is exerted on the ends of the valves 4 and 6 in the insertion directions D1 and D2 and compresses the gaskets 62, 61 and optionally 43, 44 when they are located on the ends A and B of the piston valve 4, which ensures sealing of the valves and the control systems in the equipment 1. The equipment 1 is ready to be used by the operator.

Via control commands present on the equipment 1 or on the filling machine, the operator actuates the raising of the piston rod 41 and the closing member 42 by injecting fluid into the control system 7, which opens the downstream passage 33 and ensures fluid continuity between the upstream passage 22, the cavity 31 and the downstream passage 33. An emptying step can be initiated by controlling the valve 6 prior to the filling step. Likewise, a suction step can also be carried out owing to the control of the valve 6 after the filling step.

To change the valves 4 and 6, the operator places the module 3 in the open position, thus releasing the mechanical stresses on the valves 4 and 6. Without stress on the end surfaces A, B, a and b, the valves come out simply or under a manual action, from their respective housings 21, 25. The access to the valves 4 and 6 is simultaneous.

Owing to the features described above, the equipment 1 simplifies the removal of the valves 4 and 6 from the chassis and guarantees easy replacement by the operator, while maintaining the functionalities and performance levels of the filling equipment of the prior art.

The invention claimed is:

1. Equipment for transferring fluid into a reservoir or a downstream pipe, the equipment comprising:
   a piston valve having a body and a rod comprising a closing member at an end thereof;
   a chassis defining a housing configured to receive the piston valve and an upstream passage for the fluid configured to be fluidly connected to a fluid source, the piston valve being mobile in translation in an insertion direction, between a non-inserted position in which the piston valve is located outside the housing, and an inserted position in which the piston valve is located in the housing; and
   a module separate from the piston valve and defining a cavity configured to receive the fluid from the upstream passage and a downstream discharge passage configured to be fluidly connected to the reservoir or downstream pipe, the inlet of the discharge passage defining a valve seat configured to receive the closing member of the piston valve in the deployed position, the module being movable relative to the chassis between an open position, allowing the piston valve to be inserted in the housing, and a closed position, in which the module is fastened to the chassis,
   wherein, in the closed position, the piston valve is pushed into the housing such that ends of the piston valve are in contact with the chassis.

2. The equipment according to claim 1, wherein the piston valve comprises a pneumatic or hydraulic control system of the closing member, the control system comprising a supply orifice defined by the body, and
   two sealing gaskets ensuring sealing of the supply orifice with the chassis.

3. The equipment according to claim 1, wherein two sealing gaskets form drawstrings closed around the axial direction and are respectively compressed substantially in the insertion direction between the piston valve and the chassis, and between the piston valve and the module when the piston valve is in the inserted position and the module is in the closed position.

4. The equipment according to claim 1, wherein the chassis defines at least one upstream channel configured to be connected to a fluid suction and/or vacuum line, said at least one upstream channel communicating with a downstream channel of the module, the downstream channel being connected to the downstream passage below the valve seat.

5. The equipment according to claim 4, wherein the at least one upstream channel emerges in a housing configured to receive a coaxial valve, said coaxial valve being cylindrical and comprising sealing gaskets on its two end surfaces, opposed in the insertion direction and compressed substantially in the insertion direction between the coaxial valve and the chassis and between the coaxial valve and the module when the coaxial valve is in the inserted position and the module is in the closed position.

6. The equipment according to claim 5, wherein lower ends of the piston valve and the coaxial valve are situated in the same plane when the piston valve and the coaxial valve are in the inserted position, and the module in the closed position presses on the plane to keep the piston valve and the coaxial valve in the respective housings.

7. The equipment according to claim 6, wherein the chassis is provided without a fastening system, and in the open position, the module allows the piston valve and the coaxial valve to be released from the respective housings.

8. A method for transferring a fluid into a reservoir or into a downstream pipe, the method comprising:

providing a piston valve having a body and a rod comprising a closing member at an end thereof;

providing a chassis defining a housing configured to receive the piston valve and an upstream passage for the fluid configured to be fluidly connected to a fluid source, the piston valve being mobile in translation in an insertion direction, between a non-inserted position in which the piston valve is located outside the housing, and an inserted position in which the piston valve is located in the housing;

fluidly connecting the upstream passage to the fluid source;

providing a module separate from the piston valve and defining a cavity configured to receive the fluid from the upstream passage and a downstream discharge passage configured to be fluidly connected to the reservoir or downstream pipe, the inlet of the discharge passage defining a valve seat configured to receive the closing member of the piston valve in the deployed position, the module being movable relative to the chassis between an open position, allowing the piston valve to be inserted in the housing, and a closed position, in which the module is fastened to the chassis; and fluidly connecting the downstream passage to the reservoir or downstream pipe, wherein, in the closed position, the piston valve is pushed into the housing such that ends of the piston valve are in contact with the chassis.

9. The method for transferring the fluid into the reservoir or into the downstream pipe according to claim 8, further comprising:

providing a pneumatic or hydraulic control system for the closing member; and controlling the piston valve with the control system to cause the closing member of the piston valve to go from the deployed position to the withdrawn position, allowing the fluid to pass from the upstream channel to the downstream discharge channel.

* * * * *